A. E. COOK & T. VAN TUYL.
EXTENSIBLE AIR TIGHT END FOR LAND AND WATER VEHICLE BODIES.
APPLICATION FILED DEC. 20, 1913.

1,237,174.

Patented Aug. 14, 1917.
2 SHEETS—SHEET 1.

Witnesses
Philip R. Hockenberger
Charles W. Hills Jr.

Inventor
Albert E. Cook.
Thomas Van Tuyl.
by Charles W. Hill Atty

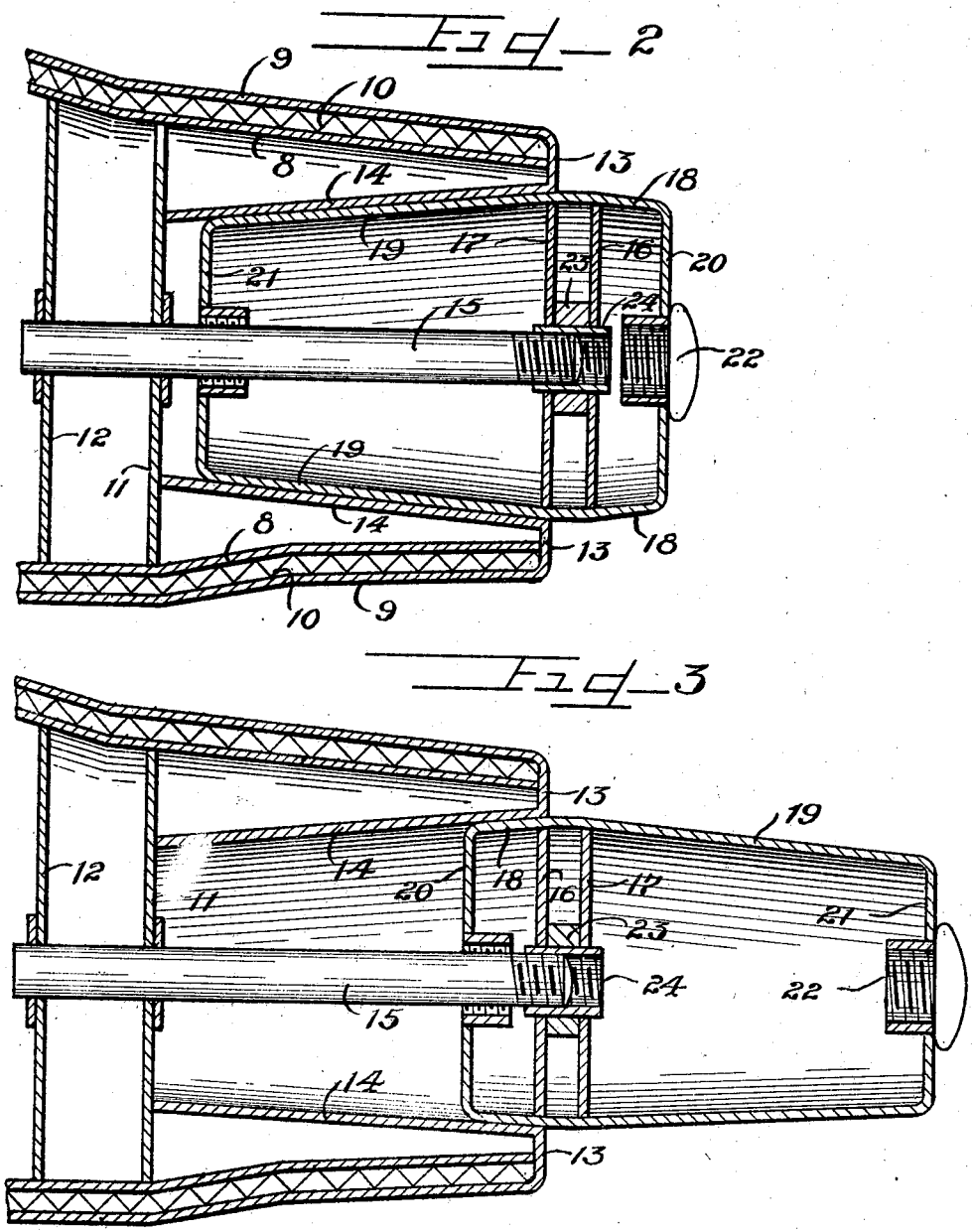

UNITED STATES PATENT OFFICE.

ALBERT E. COOK AND THOMAS VAN TUYL, OF KANKAKEE, ILLINOIS; SAID VAN TUYL ASSIGNOR TO SAID COOK.

EXTENSIBLE AIR-TIGHT END FOR LAND AND WATER VEHICLE BODIES.

1,237,174.     Specification of Letters Patent.     Patented Aug. 14, 1917.

Application filed December 20, 1913. Serial No. 807,844.

*To all whom it may concern:*

Be it known that we, ALBERT E. COOK and THOMAS VAN TUYL, citizens of the United States, and residents of the city of Kankakee, county of Kankakee, and State of Illinois, have invented certain new and useful Improvements in Extensible Air-Tight Ends for Land and Water Vehicle Bodies; and we do hereby declare that the following is a full, clear and exact description of the same, reference being had to the accompanying drawings, and to the numerals of reference marked thereon, which form a part of this specification.

The present application for patent constitutes a continuation in part of our co-pending application for patent for "combined land and water vehicles or craft", filed October 31st, 1910, Serial No. 589,888.

This invention relates to a means for not only increasing the buoyancy, but also the stability, of a land and water vehicle, when the same is used on the water. Of course, it would be undesirable to construct a vehicle which, when in use on land, would be cumbersome to handle, owing to the length of the body where such a body is at all times of the same dimension and is sufficiently large to float the vehicle upon the water.

Accordingly, it is an object of our invention to construct an extensible body, in particular the front end of a land and water craft by which, when the device is in use upon the land, the body may be considerably shortened and, when in use upon the water, may be increased in length to increase the stability and buoyancy thereof.

It is also an object of our invention to construct an extensible end built up of inner and outer air and water-tight interiorly braced walls.

It is also an object of our invention to construct an extensible end for land and water vehicles whereby the interfitting parts are of tapered construction to detachably interfit one another in sealing relation.

It is also an object of this invention to provide a water-tight extensible end for land and water vehicles, whereby a section is held rigidly in position either in extended or retracted position, by axially disposed reinforcing means.

It is furthermore an object of this invention to construct a water-tight extensible end for land and water vehicles consisting of a chamber having convergent inner walls and with a removable tapered water-tight hollow member adapted to be inserted within said chamber with either end of said hollow member projecting therefrom, in one case greatly increasing the length of the body of the vehicle, and in the other case said hollow member fitting almost entirely within said chamber, greatly reducing the length of said body.

It is finally an object of this invention to construct an extensible water-tight body simple in operation and durable in construction.

The invention (in a preferred form) is illustrated in the drawings and hereinafter more fully described.

In the drawings:

Fig. 2 is an enlarged vertical central section taken through the extensible end, and showing the same unextended.

Fig. 3 is a similar view with the end extended.

As shown in the drawings:

Figure 1:
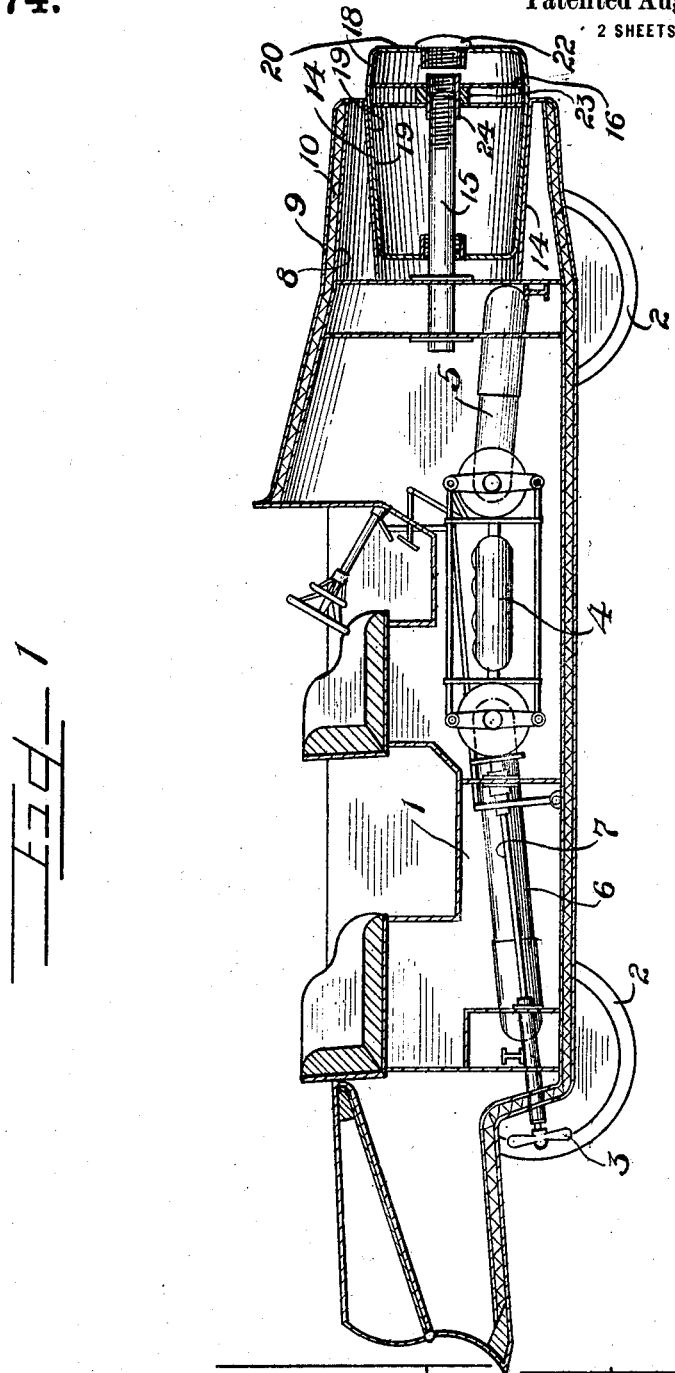
Figure 1 is a central longitudinal vertical section taken through a land and water vehicle equipped with a body having an extensible end embodying the principles of our invention.

The vehicle comprises a main body portion 1, supported upon wheels 2, and also equipped with a propeller 3. A power plant 4, is mounted centrally of the device near the lower wall or floor thereof to insure a lower center of gravity and driving connections, denoted as a whole by the reference numerals 5, and 6, drive respectively the front and rear wheels of the vehicle.

Similarly a propeller shaft 7, connects the propeller 3, with driving mechanism connected to the power plant, but inasmuch as none of the aforesaid driving connections form a part of this invention the details of description thereof are not entered into.

As clearly shown in Figs. 2 and 3, the front end of the main body portion 1, of the vehicle, is slightly conical, and consists of an inner wall 8, and an outer wall 9, which are joined together by a corrugated sheet of metal 10, inserted therebetween and welded or otherwise connected to said respective walls affording a very strong trussed construction.

A pair of bulkheads, denoted respectively by the reference numerals 11, and 12, are provided, said bulkheads extending vertically and transversely of the body at the forward end thereof. At the forward end of the main body portion 1, said outer wall 9, is flanged inwardly at the point indicated by the reference numeral 13, and is further pressed inwardly to afford a conical apartment, the walls of which are denoted by the reference numeral 14. Of course, it is not essential that said interior compartment be formed by turning the outer wall 9, inwardly in the manner described, as obviously the same end may be attained by connecting sheets of metal together suitably shaped to effect the desired purpose. A relatively large bolt 15, threaded at its outer end, is rigidly secured in said bulkheads 11, and 12, and projects axially through said conical compartment to a point slightly beyond the end or inwardly turned walls 13, of the body.

A water-tight double conical drum having a pair of interior bulkheads 16, and 17, respectively is provided. The walls 18, on one side of said bulkheads converge toward one end of the drum and walls 19, integral with the walls 18, converge toward the other end of said drum, said walls 18, being turned inwardly to form the end 20, with a threaded aperture therein, and said walls 19, similarly turned inwardly to form the end 21, with a threaded aperture therein. A plug 22, is provided, which is adapted to be threaded into either of the apertured ends 20, or 21.

Extending between the bulkheads 16, and 17, is a reinforcing filler member 23, and extending therethrough and through said bulkhead is an interiorly threaded bushing 24, adapted to receive the threaded end of the bolt 15, therethrough from either side.

The operation is as follows:

When the body of the vehicle is unextended, as shown in Figs. 1 and 2, the conical walls 19, of the water-tight drum are directed inwardly in wedging and water-tight engagement with the conical walls 14. The bolt 15, extends through the aperture in the end wall 21, and is threaded into the bushing 24, secured in the bulkhead of said drum. In this case the threaded plug 22, is engaged in the internally threaded aperture in the end wall 20, in order to prevent the admission of water to the interior of the drum.

When it is desired to extend the vehicle end, as when embarking upon water, the water-tight drum is unthreaded from said bolt 15, and entirely withdrawn therefrom, and after removing the plug 22, said drum is inverted with the short tapered end 18, projecting into the conical chamber within the main body of the vehicle and the drum is again threaded on said bolt 15. The plug 22, is then inserted in the aperture in the end 21, to close the same and prevent admission of water thereto. It is obvious that, owing to the threaded connection between the removable water-tight member and the main body of the vehicle, a very tight fit is obtained between the respective convergent walls of the different parts.

We are aware that various details of construction may be varied through a wide range without departing from the principles of this invention, and we therefore do not purpose limiting the patent granted otherwise than necessitated by the prior art.

We claim as our invention:

1. In a vehicle body of the class described a removable water-tight drum, apertures in each end thereof, a bolt secured on the vehicle body adapted to extend through one of said apertures of said removable member, and a threaded bushing contained within said removable water-tight member to engage the end of said bolt and retain said drum in water-tight relation with said vehicle body.

2. In a land and water vehicle body, an extensible end therefor comprising a removable water-tight section adapted to be contained within a recess in the body of the vehicle, a bolt rigidly mounted in the body of the vehicle adapted to engage said removable section to retain the same in position, and the walls of said removable member shaped to permit insertion of either end of said section within the recess in the main body of the vehicle to fit in sealing relation therewith and permit lengthening and shortening of the body as a whole.

3. In a device of the class described means for extending the length of a water-tight body comprising a main body having a conical recess therein, an axial bolt secured in said main body and projecting through said conical recess, a water-tight member apertured at each end to permit insertion thereof into said recess with said bolt projecting through the apertures, said member in one position affording, together with said main body, a short body, and in another a long body, and a removable plug adapted to thread into the aperture in the outer end of said removable member to prevent admission of water thereto.

4. In a device of the class described water-tight interfitting members, one thereof adapted to interfit the other at either of its ends, the walls thereof being convergent in opposite directions for the purpose, means within one of said members to positively engage the other, and means for closing an aperture in one end of said doubly convergent walled member.

5. In a water-tight vehicle of the class described, a buoyant body, and reversible means adapted to interfit the same to vary the length of said body for further buoyancy and stability.

6. In a land and water vehicle of the class described a water-tight body, means at each end thereof for increasing the length of said body, one of said means comprising a doubly convergent drum adapted to be sealingly inserted either end first into one end of said body, and means for holding the same secured in either of said positions with respect to the body.

7. In a land and water vehicle of the class described a water-tight body, and means forming a part thereof at each end of said body for elongating the same to increase the buoyancy and stability of the body for use on water, said means at one end of the body capable of detachment therefrom and shaped to be reversely fitted thereto.

8. In a land and water vehicle of the class described a water-tight body, and means normally carried sealingly within one end of said body adapted to be detached therefrom and reversely associated with said body to increase the length thereof for further buoyancy and stability for use upon water.

In testimony whereof we have hereunto subscribed our names in the presence of two subscribing witnesses.

ALBERT E. COOK.
THOMAS VAN TUYL.

Witnesses:
CHARLES W. HILLS, Jr.,
FRANK K. HUDSON.